Aug. 11, 1931.  J. L. J. R. VERDINI  1,818,914
CAMPING INSTALLATION
Filed Dec. 27, 1930    3 Sheets-Sheet 1
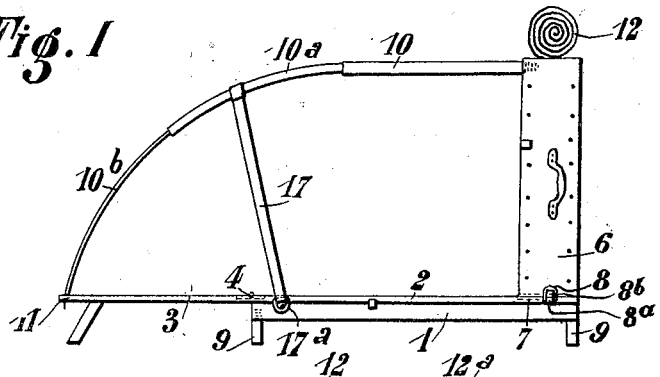
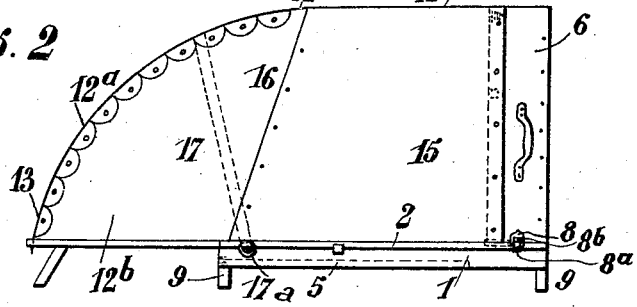
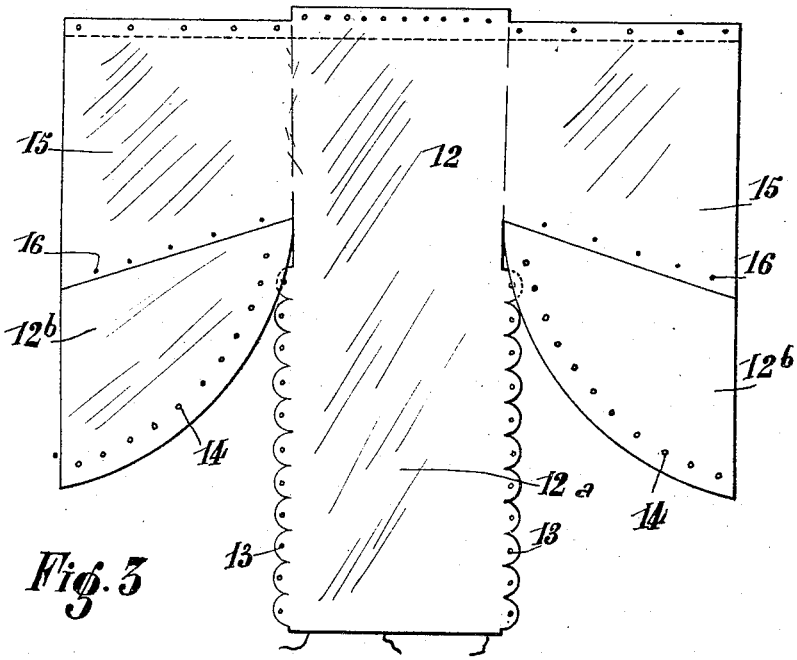
Inventor
Jean L. J. R. Verdini
by Wilkinson & Mawhinney
Attorneys.

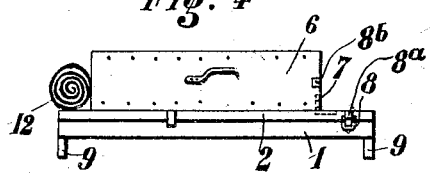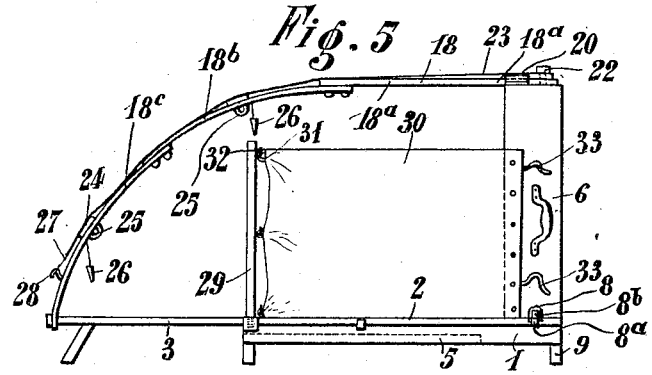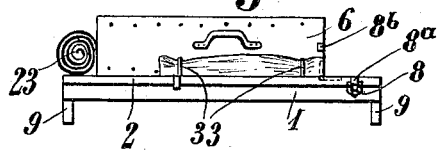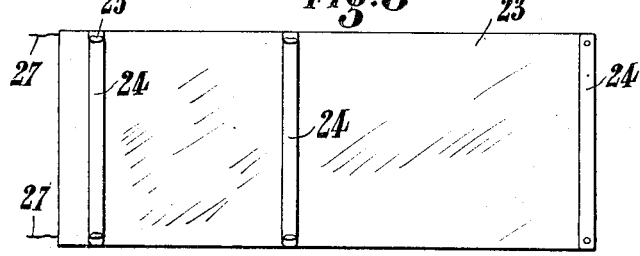

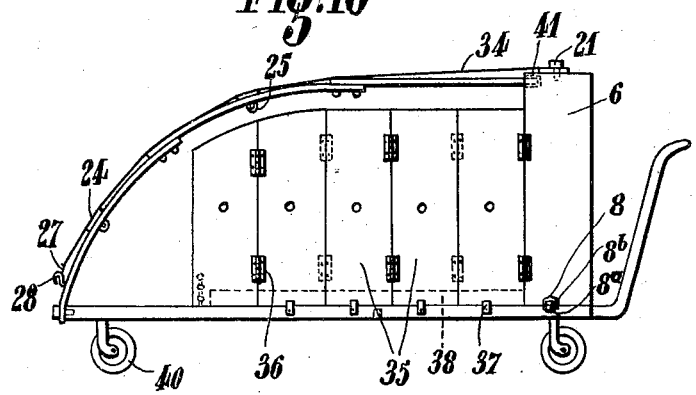
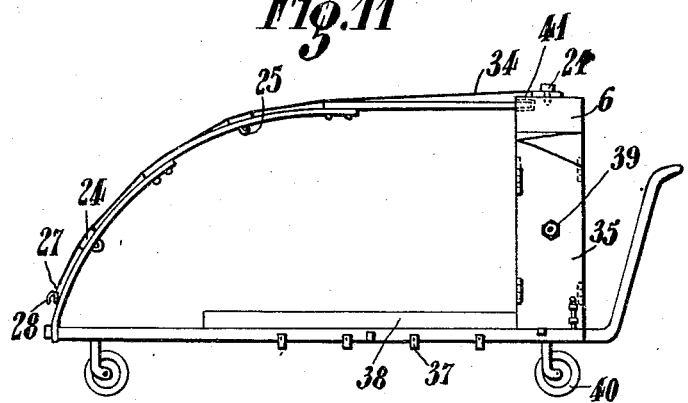

Patented Aug. 11, 1931

1,818,914

UNITED STATES PATENT OFFICE

JEAN LOUIS JOSEPH ROBERT VERDINI, OF OUDJDA, MOROCCO

CAMPING INSTALLATION

Application filed December 27, 1930, Serial No. 505,183, and in Germany June 17, 1929.

The present invention relates to a camping installation which may be readily erected and dismantled for purposes of transportation.

One object of the invention is to provide a very light structure of very reduced size for transport but which can be extended for use when erected.

Another object of the invention is to provide a pliable frame-work adapted to support any suitable impermeable cover member forming a roof for said camping apparatus.

Another object of the present invention is to provide side walls for said apparatus which may either be integral with the aforementioned roof or independent thereof.

With these and other objects in view, the invention includes the novel features of construction and arrangement and combination of parts hereinafter described and particularly defined by the appended claims.

Several embodiments of the invention have been illustrated in the accompanying drawings in which:

Fig. 1 is a longitudinal elevation of one embodiment of the camping installation according to the invention, after erection, the covering being shown rolled up.

Fig. 2 is a similar view of the apparatus with the cover unrolled and in position to provide shelter.

Fig. 3 is a developed plan view of the covering.

Fig. 4 is a similar view to Fig. 1 but showing the installation packed up.

Fig. 5 is a longitudinal elevation of a modified form of apparatus after erection.

Fig. 6 is a similar view to Fig. 5 of the same apparatus packed up.

Fig. 7 is a detail view of part of the framework of this modification.

Fig. 8 is a detail plan view of the covering.

Fig. 9 is a detail of the device for fixing the frame-work to the cupboard.

Fig. 10 is a longitudinal elevation of another modification.

Fig. 11 is a similar view to Fig. 10, showing the side panels folded up against the cupboard.

In the embodiment illustrated in Figs. 1 to 4 inclusive, the camping outfit comprises a frame member 1 supporting a flooring 2 which can be extended by a leaf 3 hinged to the flooring 2 as at 4 Fig. 1, or adapted to be pulled out from a recess 5 formed in the frame 1 as illustrated in Fig. 2.

To said flooring 2 is hingedly secured a cupboard 6 adapted to be swung into the upright position where it rests on the end of the flooring 2, or to be closed down over said flooring 2. To this end, the hinge 7 of the cupboard is situated at a short distance from the end of the flooring 2. Said cupboard 6 may be maintained upright by means of locking devices which may comprise stirrup members 8 hingedly mounted on plates $8^a$ secured to the floor 2 and adapted to be swung over into engagement with projecting plates $8^b$ carried by the cupboard 6. The frame 1 rests on legs 9 screwed into or otherwise detachably secured to the frame 1.

The skeleton structure of the camping installation is completed by a number of rods 10 preferably made of bamboo and adapted to fit into each other after the manner of fishing rods. In Fig. 1 three of these rods, 10, $10^a$, $10^b$, have been shown. The rod 10 screws into the top of the cupboard 6 and the two rods $10^a$ and $10^b$ are given an arcuate form as shown in the drawing, the outer end of the rod $10^b$ having a metallic end piece 11 entering a hole in the leaf 3. There are, of course, two sets of such rods extending on either side of the cupboard 6.

The structure thus formed may be roofed by means of a waterproof canvas top 12 (Fig. 2) comprising a top proper $12^a$ and side portions $12^b$ which are plainly visible in the developed view of said top shown in Fig. 3. The top proper $12^a$ is provided with buttons 13 adapted to engage in button-holes 14 formed in the side portions $12^b$ of the cover. Said top 12 is nailed at one end to the top of the cupboard 6 and can be rolled up as shown in Fig. 1, the roll thus formed resting on the top of the cupboard. After said top has been unrolled so as to cover the rods 10, 10ᵃ and 10ᵇ, the buttons 13 are engaged in the button-holes 14 so as to maintain said cover in place covering over said rod structure. To said side portions 12ᵇ may be secured flaps 15 for example by means of press-buttons 16 but any other suitable fastening means may be used. As shown in Fig. 2, the flaps need not extend beyond the flooring 2.

To strengthen the structure, guy ropes formed by canvas strips 17 are connected between the bamboo rods 10ᵃ and the end of the frame 1, said guy ropes 17 being fastened to rings 17ᵃ secured to said frame 1.

For transport, the buttons 13 are disengaged from the button-holes 14, the side portions 13 including the flaps 15 are then folded over the top proper 12ᵃ and the top 12 rolled up. The guy ropes 17 having been untied, the bamboo rods 10ᵃ and 10ᵇ are then taken apart and the rods 10 unscrewed from the cupboard 6, all said rods being then stowed away in said cupboard. The locking plates 8 are then rotated and the cupboard 6 swung down into the horizontal position in which it rests on the flooring 2. The apparatus is then ready to be transported. It will be understood that the inverse sequence of operations is resorted to when it is desired to erect the installation.

In the modification illustrated in Fig. 5, the bamboo rods are replaced by two or more resilient steel blades 18 each divided into three sections 18ᵃ, 18ᵇ, 18ᶜ, that can be connected together as shown in Fig. 7 by means of headed pins 19 on one blade and co-operating keyhole slots 20 in the adjacent blade.

Figs. 5 and 9 show how each resilient steel strip 18ᵃ is secured to the cupboard 6. To the cupboard 6 is nailed or otherwise secured a stirrup member 20 through which passes the strip 18ᵃ. A hole is drilled in said strip 18ᵃ near its end and a bolt 22 passed through it and into a corresponding hole drilled in said cupboard.

In the embodiment of Fig. 5, the covering comprises separate top and side portions. The top portion comprises a canvas sheet 23 (Fig. 8) mounted on boards 24 arranged across the sheet, said boards being narrow and preferably not more than three in number so that said sheet 23 can be easily rolled up. One end of the sheet 23 is secured to the cupboard 6 through the medium of one of the boards 24 through which passes the aforementioned bolt 22 and the sheet 18 when rolled up rests on the top of the cupboard in similar fashion to the top 12 of the embodiment illustrated in Fig. 1. When the sheet 18 is unrolled, the boards 24 are supported at their ends on the steel blade sections 18ᵃ, 18ᵇ, 18ᶜ respectively. In order to hold them in position on said sections, the boards 24 are provided with rings 25 adapted to engage in slots 25ᵃ in the sections 18ᵇ and 18ᶜ, which rings can be locked by inserting therein pins 26 which may depend from the boards 24. The end of the canvas sheet 23 projecting beyond the last board has tapes 27 which can be fastened to hooks 28 fitted to the steel sections 18ᶜ.

Standards 29 can be screwed into the corners of the flooring 2 remote from the cupboard 6 and between each standard 29 and a corresponding side of the cupboard 6 is stretched a canvas sheet 30 provided with rings or tabs 31 adapted to engage with hooks 32 carried by the standard 29. The sheet 30 is nailed or otherwise suitably secured to the side of the cupboard 6 and is provided with straps 33 adapted to be strapped round said sheet when it is rolled up in order to prevent it from unrolling. This installation can be taken down in similar manner as the previous one, the steel sections 18ᵃ, 18ᵇ, 18ᶜ being stowed away in the cupboard 6 together with the standards 29, Fig. 6 showing the apparatus packed up and ready for transportation.

In the modification illustrated in Figs. 10 and 11, the leaf 3 has been eliminated and the canvas top replaced by a three-ply wood roofing 34. The sides of the installation are sheltered by two screens each formed by a plurality of panels 35 also made of three-ply wood and hingedly connected together, the hinges 36 being arranged preferably alternately on the outside and inside of the panels, the end panels being hinged to the cupboard 6. Rotatable locking plates or turn-buttons 37 are provided on the outside of said screens cooperating with battens 38 mounted, as are said plates 37, on the flooring 2, to retain said panels vertical. Once the locking plates 37 have been swung out of operative position, the panels 35 can be folded back against the sides of the cupboard 6 and a screw 39 passed through them all to hold them in place. The apparatus can be mounted on castors 40 so that it can be wheeled about.

In Fig. 10 has been illustrated another method of securing each steel section 18ᵃ in the cupboard 6. Two cuts 41 are made in the top of the cupboard 6 at either side thereof and the end of a blade 18ᵃ is forced into each cut.

The cupboard described in connection with the various embodiments illustrated may of course be used to house all kinds of articles for camping including bedding, mattresses and so forth, and the apparatus may be subjected to various modifications of detail without departing from the scope of the invention.

I claim:

1. Transportable camping apparatus comprising a case, a second case having means whereby it is adapted to fold downwardly and upwardly with respect to said first case, and a pliable frame-work adapted to span the distance between the top of said second case and the end of said first case remote from said second case.

2. Transportable camping apparatus comprising a case, a second case having means whereby it is adapted to fold downwardly and upwardly with respect to said first case, a pliable frame-work adapted to span the distance between the top of said second case and the end of said first case remote from said second case, and a covering adapted to roll and unroll whereby it can cover over or expose said pliable frame-work.

3. Transportable camping apparatus comprising a case, a second case having means whereby it is adapted to fold downwardly and upwardly with respect to said first case, and a pliable frame-work adapted to span the distance between the top of said second case and the end of said first case remote from said second case, said frame-work comprising a plurality of bamboo rods adapted to fit into each other.

4. Transportable camping apparatus comprising a case, a second case having means whereby it is adapted to fold downwardly and upwardly with respect to said first case and a pliable frame-work comprising two sets of bamboo rods adapted to fit into each other, the outer rods of each set being connected to the top of said second case and the outer end of said first case respectively.

5. Transportable camping apparatus comprising a supporting frame, an extension member removably associated with said supporting frame, a case having means whereby it is adapted to fold downwardly and upwardly with respect to said supporting frame, and a pliable frame-work adapted to span the distance between the top of said case and the outer end of said extension member.

JEAN LOUIS JOSEPH ROBERT VERDINI.